(12) United States Patent
Hsieh et al.

(10) Patent No.: US 12,730,338 B2
(45) Date of Patent: Sep. 8, 2026

(54) E-paper DISPLAY PANEL

(71) Applicant: E Ink Holdings Inc., Hsinchu (TW)

(72) Inventors: Chia-Ming Hsieh, Hsinchu (TW); Chi-Mao Hung, Hsinchu (TW); Sung-Hui Huang, Hsinchu (TW); Chuen-Jen Liu, Hsinchu (TW); Liang-Yu Yan, Hsinchu (TW); Pei Ju Wu, Hsinchu (TW); Po-Chun Chuang, Hsinchu (TW); Che-Sheng Chang, Hsinchu (TW); Wen-Chung Yang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 267 days.

(21) Appl. No.: 18/769,424

(22) Filed: Jul. 11, 2024

(65) Prior Publication Data

US 2025/0053039 A1 Feb. 13, 2025

(30) Foreign Application Priority Data

Aug. 8, 2023 (TW) ................................ 112129681

(51) Int. Cl.
*G02F 1/1333* (2006.01)
*G02F 1/1343* (2006.01)
(Continued)

(52) U.S. Cl.
CPC .... *G02F 1/13338* (2013.01); *G02F 1/134309* (2013.01); *G02F 1/1368* (2013.01);
(Continued)

(58) Field of Classification Search
CPC .................................................. G02F 1/13338
See application file for complete search history.

(56) References Cited

U.S. PATENT DOCUMENTS 9,024,913 B1 5/2015 Jung et al.
9,058,075 B2 6/2015 Lee et al.
(Continued)

FOREIGN PATENT DOCUMENTS

CN 104503173 4/2015
CN 104991392 10/2015
(Continued)

OTHER PUBLICATIONS

"Office Action of Related, U.S. Appl. No. 18/769,410", issued on Mar. 24, 2025, p. 1-p. 15.
(Continued)

*Primary Examiner* — Edmond C Lau
(74) *Attorney, Agent, or Firm* — JCIPRNET

(57) ABSTRACT

An E-paper display panel including an E-paper display layer, a first substrate, a pixel array layer, a common electrode layer, and a driving circuit is provided. The first substrate is disposed at a first side of the E-paper display layer. The pixel array substrate is disposed between the first substrate and the E-paper display layer and includes touch electrodes and driving pixels arranged in an array. Each driving pixel includes a first pixel electrode and a second pixel electrode. The touch electrodes, the first pixel electrode, and the second pixel electrode are overlapped with each other. The common electrode layer is disposed at a second side of the E-paper display layer. The first side is opposite to the second side. The driving circuit is in signal communication with the common electrode layer and the pixel array layer. The touch electrodes are individually in signal communication with the driving circuit.

11 Claims, 8 Drawing Sheets

(51) Int. Cl.

| | |
|---|---|
| ***G02F 1/1368*** | (2006.01) |
| ***G02F 1/167*** | (2019.01) |
| ***G02F 1/1676*** | (2019.01) |
| ***G02F 1/1685*** | (2019.01) |

(52) U.S. Cl.

CPC ............ *G02F 1/167* (2013.01); *G02F 1/1676* (2019.01); *G02F 1/1685* (2019.01)

(56) References Cited

U.S. PATENT DOCUMENTS

| | | | | |
|---|---|---|---|---|
| 10,275,089 | B2 | 4/2019 | Kim et al. | |
| 10,345,575 | B1 | 7/2019 | Wei et al. | |
| 10,444,901 | B2 | 10/2019 | Shin | |
| 10,496,205 | B2 | 12/2019 | Jung et al. | |
| 11,307,446 | B2 | 4/2022 | Ahn | |
| 2015/0309624 | A1 | 10/2015 | Hotelling et al. | |
| 2018/0329268 | A1* | 11/2018 | Li | G02F 1/167 |
| 2020/0333899 | A1 | 10/2020 | Kurasawa et al. | |
| 2023/0121668 | A1 | 4/2023 | Wang et al. | |

FOREIGN PATENT DOCUMENTS

| | | |
|---|---|---|
| CN | 205721708 | 11/2016 |
| CN | 107887336 | 4/2018 |
| TW | 201409436 | 3/2014 |
| TW | 201602703 | 1/2016 |

OTHER PUBLICATIONS

"Office Action of Taiwan Related Application, Application No. 113115889", issued on Apr. 17, 2025, p. 1-p. 3.

"Office Action of Taiwan Counterpart Application", issued on Aug. 9, 2024, pp. 1-5.

* cited by examiner

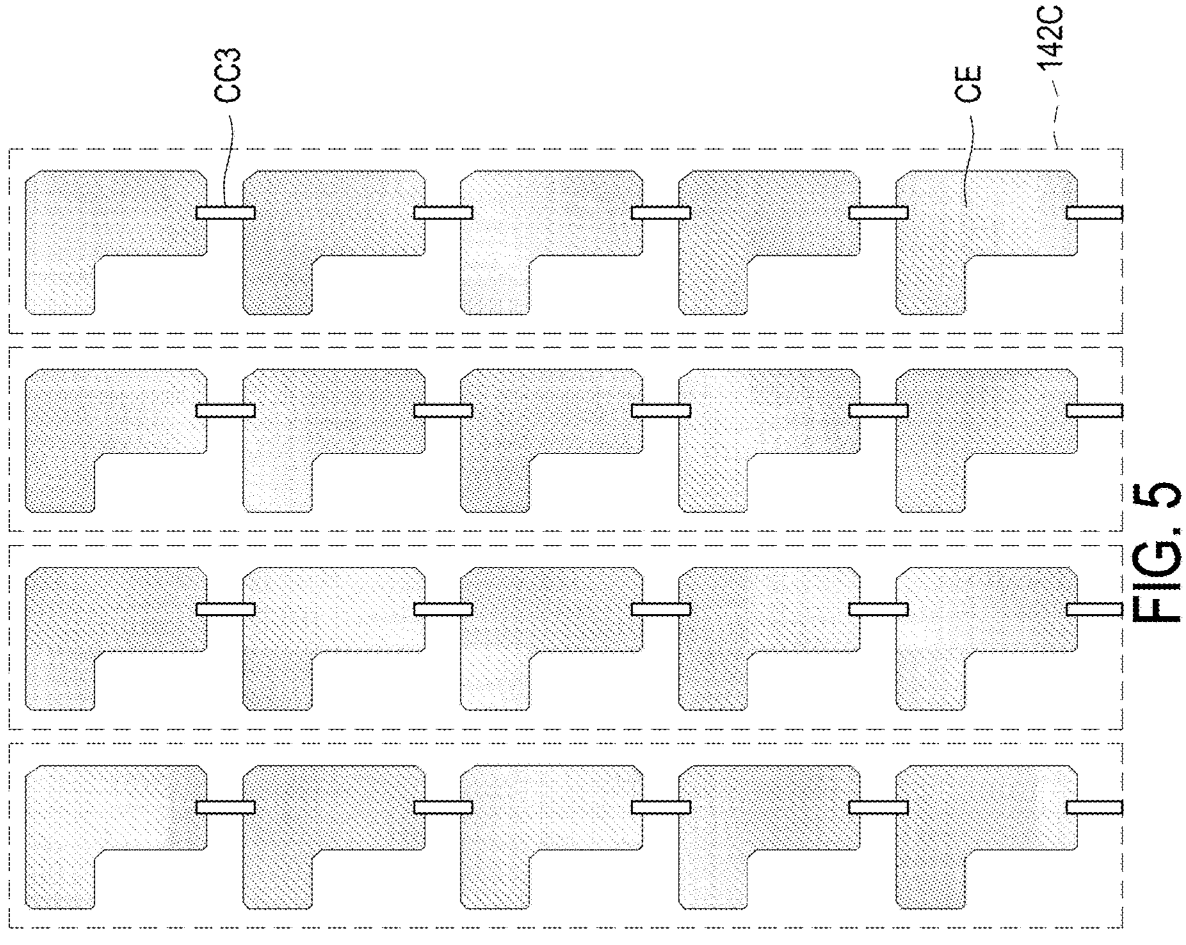
FIG. 5
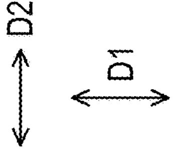

E-paper DISPLAY PANEL

CROSS-REFERENCE TO RELATED APPLICATION

This application claims the priority benefit of Taiwan application serial no. 112129681, filed on Aug. 8, 2023. The entirety of the above-mentioned patent application is hereby incorporated by reference herein and made a part of this specification.

BACKGROUND OF THE INVENTION

Field of the Invention

The invention relates to a display panel, and in particular to an E-paper display panel.

Description of Related Art

The E-paper display panel may be widely used in various display products because of features such as light and thin and low energy consumption thereof. With the development of various techniques, products with multiple functions have become an important direction of research and development. For example, the E-paper display panel may integrate a touch panel to achieve a design that combines both touch and display.

SUMMARY OF THE INVENTION

The invention provides an E-paper display panel having both display and touch functions.

An E-paper display panel of the invention includes an E-paper display layer, a first substrate, a pixel array layer, a common electrode layer, and a driving circuit. The first substrate is disposed at a first side of the E-paper display layer. The pixel array substrate is disposed between the first substrate and the E-paper display layer and includes a plurality of touch electrodes and a plurality of driving pixels arranged in an array. Each of the driving pixels includes a first pixel electrode and a second pixel electrode. The touch electrodes, the first pixel electrode, and the second pixel electrode are overlapped with each other. The common electrode layer is disposed at a second side of the E-paper display layer. The first side is opposite to the second side. The driving circuit is in signal communication with the common electrode layer and the pixel array layer, wherein the touch electrodes are individually in signal communication with the driving circuit.

In an embodiment of the invention, the touch electrodes include N capacitive electrodes, each of the N capacitive electrodes is located in one of the driving pixels and overlapped with a corresponding first pixel electrode and a corresponding second pixel electrode, and N is greater than 1 and does not exceed a number of the driving pixels.

In an embodiment of the invention, each of the touch electrodes is extended along a first direction, and the touch electrodes are arranged in parallel along a second direction, wherein the first direction is intersected with the second direction. The common electrode layer includes a plurality of common electrodes, each of the common electrodes is extended along the second direction, and the common electrodes are arranged in parallel along the first direction.

In an embodiment of the invention, the touch electrodes are arranged in an array.

In an embodiment of the invention, the E-paper display panel further includes a second substrate. The second substrate is disposed opposite to the first substrate, and the common electrode layer is located between the second substrate and the E-paper display layer and in direct contact with the E-paper display layer.

In an embodiment of the invention, the driving circuit is adapted to alternately execute a signal providing mode and a signal reading mode for the touch electrodes.

In an embodiment of the invention, the common electrode layer includes a plurality of common electrodes, and the common electrodes are arranged in an array to define independent touch sensing areas.

In an embodiment of the invention, each of the driving pixels further includes an active element. The active element includes a gate, a source, and a drain, and both the first pixel electrode and the second pixel electrode are connected to the drain.

In an embodiment of the invention, the first pixel electrode includes two pixel electrode sublayers made of different materials.

In an embodiment of the invention, each of the touch electrodes includes a plurality of capacitive electrodes and a plurality of connecting segments. The connecting segments connect the capacitive electrodes together, and each of the capacitive electrodes is located in one of the driving pixels.

Based on the above, the E-paper display panel of an embodiment of the invention uses existing components to provide the touch function. Therefore, the E-paper display panel may implement dual functions of touch control and display under a thin and light volume.

BRIEF DESCRIPTION OF THE DRAWINGS

FIG. 5 is a schematic top view of the touch electrodes in an E-paper display panel of an embodiment of the invention.

DESCRIPTION OF THE EMBODIMENTS

Figure 1:
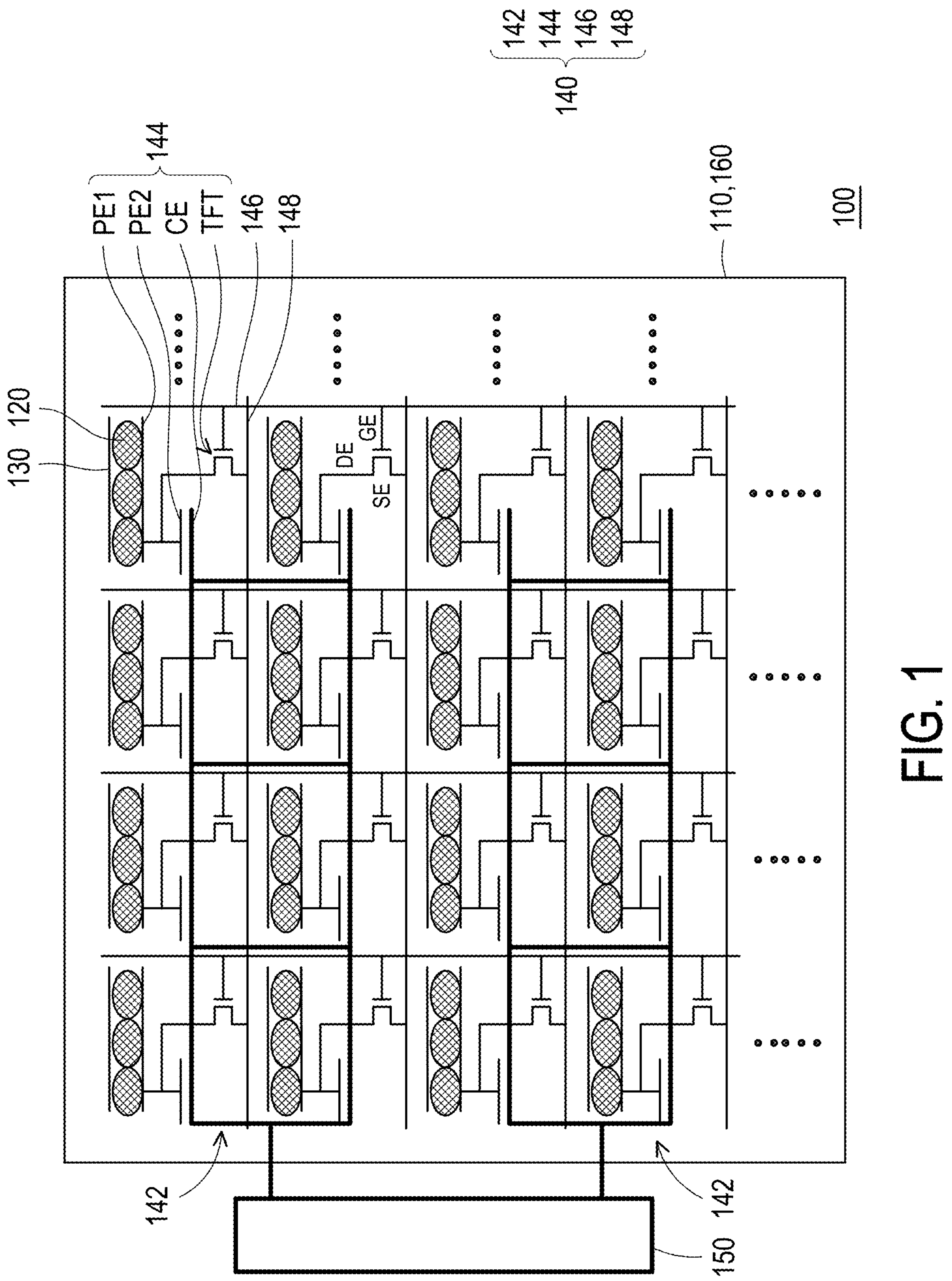
FIG. 1 is a schematic diagram of an E-paper display panel of an embodiment of the invention.

FIG. 1 is a schematic diagram of an E-paper display panel of an embodiment of the invention. An E-paper display panel 100 includes a first substrate 110, an E-paper display layer 120, a common electrode layer 130, a pixel array layer 140, a driving circuit 150, and a second substrate 160. For the convenience of presenting individual members, FIG. 1 shows the E-paper display layer 120, the common electrode layer 130, the pixel array layer 140, and the driving circuit 150 with simplified circuit symbols and figures, so FIG. 1 is not used to present the specific structures of individual members. The first substrate 110 and the second substrate 160 may have sufficient support, and may also optionally further have moderate flexibility. The material of the first substrate 110 and the second substrate 160 may include a material applicable to substrates in the art such as glass and plastic. Moreover, the first substrate 110 and the second substrate 160 are two stacked plate members, and the E-paper display layer 120, the common electrode layer 130, and the pixel array layer 140 may be disposed between the first substrate 110 and the second substrate 160. The edges of the first substrate 110 and the second substrate 160 may be aligned or not aligned with each other, but are marked on the same edge at the same time in FIG. 1 to simplify the content of the drawing.

The E-paper display layer 120 is represented by a plurality of oval figures in FIG. 1. The E-paper display layer 120 may include an E-paper display material encapsulated in the form of a capsule or a microcup. For example, the E-paper display material may include an electrophoretic display material, an electrowetting display material, or other materials having similar functions. The E-paper display layer 120 may be a prefabricated independent layer, and is disposed on the first substrate 110 by way of sticking. In some embodiments, the first substrate 110 is disposed at a first side of the E-paper display layer 120, the second substrate 160 is disposed at a second side of the E-paper display layer 120, and the first side is opposite to the second side.

The common electrode layer 130 is an electrode layer disposed at the second side of the E-paper display layer 120. The common electrode layer 130 is substantially located between the second substrate 160 and the E-paper display layer 120. In some embodiments, the second side of the E-paper display layer 120 is a side adjacent to a user for presenting a display image. The common electrode layer 130 may include a transparent conductive layer. In some embodiments, the common electrode layer 130 may include a carrying layer and a transparent conductive layer disposed on the carrying layer, and the common electrode layer 130 may be disposed at the second side of the E-paper display layer 120 in a sticking manner.

The pixel array layer 140 is disposed between the first substrate 110 and the E-paper display layer 120. The pixel array layer 140 includes a plurality of touch electrodes 142 and a plurality of driving pixels 144 arranged in an array. Each of the driving pixels 144 includes a first pixel electrode PE1 and a second pixel electrode PE2, and the touch electrodes 142, the first pixel electrode PE1, and the second pixel electrode PE2 are overlapped with each other. The first pixel electrode PE1 and the second pixel electrode PE2 are electrically connected to each other and have the same potential when the E-paper display panel 100 is in operation. FIG. 1 only schematically shows the electrical connection relationship among the touch electrodes 142, the first pixel electrode PE1, and the second pixel electrode PE2, but does not limit the stacking order of these electrodes. The pixel second electrode PE2 may be used as a storage capacitor electrode of the driving pixels 144.

In some embodiments, each of the driving pixels 144 further includes an active element TFT, and the pixel array layer 140 further includes a plurality of scan lines 146 and a plurality of data lines 148. The active element TFT of each of the driving pixels 144 may be electrically connected to one of the scan lines 146 and one of the data lines 148. The active element TFT includes a gate GE, a source SE, and a drain DE. The gate GE is connected to the corresponding scan line 146, the source SE is connected to the corresponding data line 148, and the drain DE is connected to the corresponding first pixel electrode PE1 and second pixel electrode PE2.

Moreover, the touch electrodes 142 include N capacitive electrodes CE, each of the N capacitive electrodes CE is located in one of the driving pixels 144 and overlapped with the corresponding first pixel electrode PE1 and the corresponding second pixel electrode PE2, wherein N is greater than 1 and does not exceed the number of the driving pixels 144. In other words, each of the touch electrodes 142 is formed by connecting the capacitive electrodes CE of the N driving pixels 144. Taking FIG. 1 as an example, FIG. 1 presents 16 driving pixels 144 and 2 touch electrodes 142 in a 4×4 array, and each of the touch electrodes 142 is composed of the capacitive electrodes CE of 8 driving pixels 144 in a 2×4 array (that is, N is 8). In other embodiments, the touch electrodes 142 may be formed by connecting other numbers of the capacitive electrodes CE, not limited to the capacitive electrodes CE in a 2×4 array. For example, the designer may determine the size of the touch electrodes 142 according to the resolution desired by the touch function.

In the present embodiment, the driving circuit 150 may be in signal communication with the common electrode layer 130 and the pixel array layer 140. Specifically, the driving pixels 144 in the pixel array layer 140 may be individually in signal communication with the driving circuit 150, and the touch electrodes 142 may also be individually in signal communication with the driving circuit 150 so that the driving pixels 144 and the touch electrodes 142 may be operated independently. In some embodiments, the plurality of touch electrodes 142 may be arranged in an array, and each of the touch electrodes 142 may define an independent touch sensing area to implement the sensing function. The independent touch sensing areas defined by each of the touch electrodes 142 may allow the user to perform a single-point pressing operation, but is not limited thereto.

In some embodiments, after the driving pixels 144 and the common electrode layer 130 individually receive a display signal, the electric field between the first pixel electrode PE1 and the common electrode layer 130 may drive the E-paper display layer 120 corresponding to the driving pixels 144 to exhibit a specified brightness, thereby implementing the display function. At the same time, the driving circuit 150 may alternately execute a signal providing mode and a signal reading mode for the touch electrodes 142. In the signal providing mode, the driving circuit 150 provides a signal to the touch electrodes 142. Then, each of the capacitive electrodes CE of the touch electrodes 142 may generate a capacitive effect with the corresponding pixel electrode (including the first pixel electrode PE1 and the second pixel electrode PE2), so as to provide a storage capacitor for stabilizing the display state. In the signal reading mode, the driving circuit 150 may receive the signal on the touch electrodes 142 and determine whether the received signal is floating for touch sensing.

For example, under no touch action, the coupling effect received by the touch electrodes 142 is approximately stable, so the signal on the touch electrodes 142 received by the driving circuit 150 is approximately constant. When a touch action occurs, for example, the user approaches or touches a specific position of the E-paper display panel 100 with a finger, a conductive object, or a capacitive stylus, the touch electrode 142 at the corresponding position produces a significant signal change due to the coupling effect of the touching object. Therefore, the significant signal change on the touch electrode 142 received by the driving circuit 150 may determine the occurrence of a touch.

Figure 2:
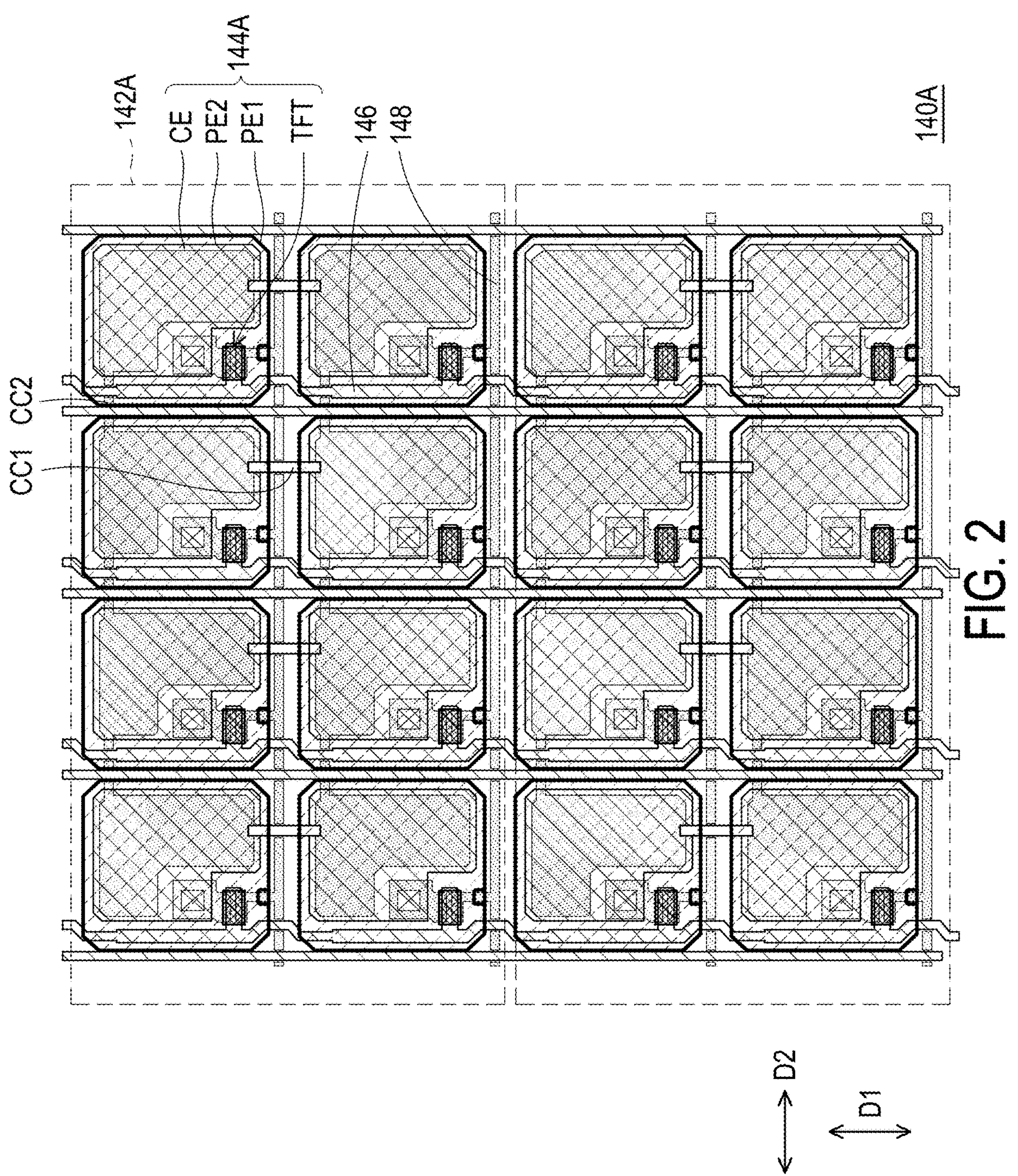
FIG. 2 is a schematic top view of a pixel array layer of an embodiment of the invention.
Figure 3:
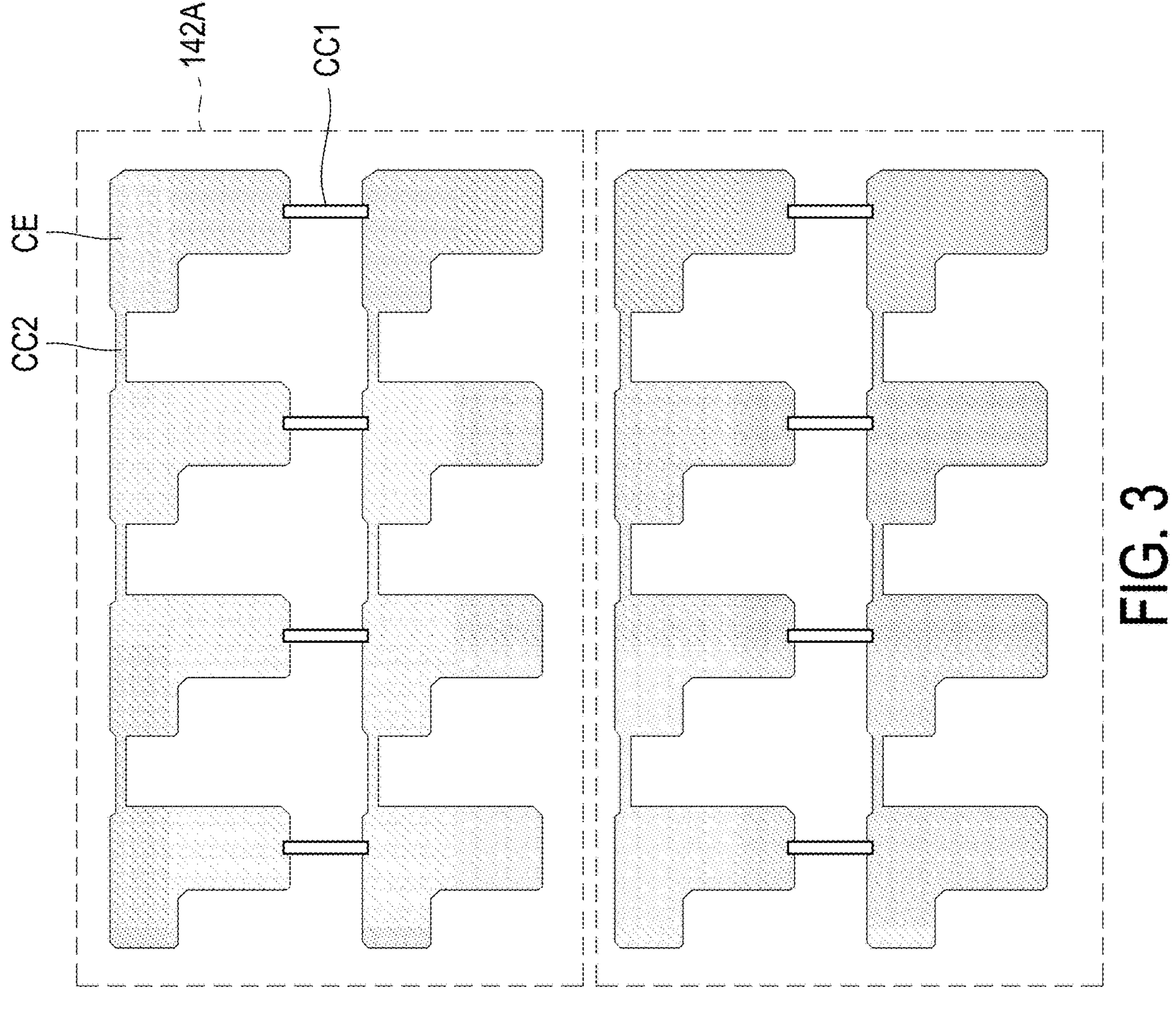
FIG. 3 presents a schematic top view of the touch electrodes in FIG. 2.

FIG. 2 is a schematic top view of a pixel array layer of an embodiment of the invention. The reference numerals employed in FIG. 2 are substantially the same as the reference numerals of FIG. 1 and are used to refer to the same elements. However, FIG. 2 is used to represent possible outlines of individual elements in the pixel array layer in the top view, and is not used to limit the specific structures of these elements. Moreover, FIG. 3 presents a schematic top view of the touch electrodes in FIG. 2. In FIG. 2 and FIG. 3, a pixel array structure 140A includes touch electrodes 142A, driving pixels 144A, the scan lines 146, and the data lines 148. The connection relationship among the touch electrodes 142A, the driving pixels 144A, the scan lines 146, and the data lines 148 is as provided in the description of the touch electrodes 142, the driving pixels 144, the scan lines 146, and the data lines 148 in FIG. 1.

In FIG. 2, the scan lines 146 are extended along a first direction D1 and the data lines 148 are extended along a second direction D2, and the first direction D1 is intersected with the second direction D2. The driving pixels 144A may be disposed in a grid formed by the intersection of the scan lines 146 and the data lines 148. The active element TFT may be located near the intersection of the scan lines 146 and the data lines 148 so as to be connected to the corresponding scan line 146 and data line 148. The touch electrodes 142 include the plurality of capacitive electrodes CE, and individual capacitive electrodes CE may be overlapped with the corresponding first pixel electrode PE1 and second pixel electrode PE2.

In addition, as shown in FIG. 2 and FIG. 3, the touch electrodes 142A further include a plurality of first connecting segments CC1 and a plurality of second connecting segments CC2. The first connecting segments CC1 connect the plurality of capacitive electrodes CE together along the first direction D1, and the second connecting segments CC2 connect the plurality of capacitive electrodes CE together along the second direction D2 to form the touch electrodes 142A. In some embodiments, the second connecting segments CC2 and the capacitive electrodes CE may be the same layer, while the first connecting segments CC1 and the capacitive electrodes CE may be different layers, but not limited thereto. In some embodiments, the scan lines 146 and the second connecting segments CC2 may be different layers, so as to allow the second connecting segments CC2 to traverse the scan lines 146 without shorting the scan lines 146. Similarly, the data lines 148 and the first connecting segments CC1 may be different layers, so as to allow the first connecting segments CC1 to traverse the data lines 148 without shorting the data lines 148.

Figure 4:
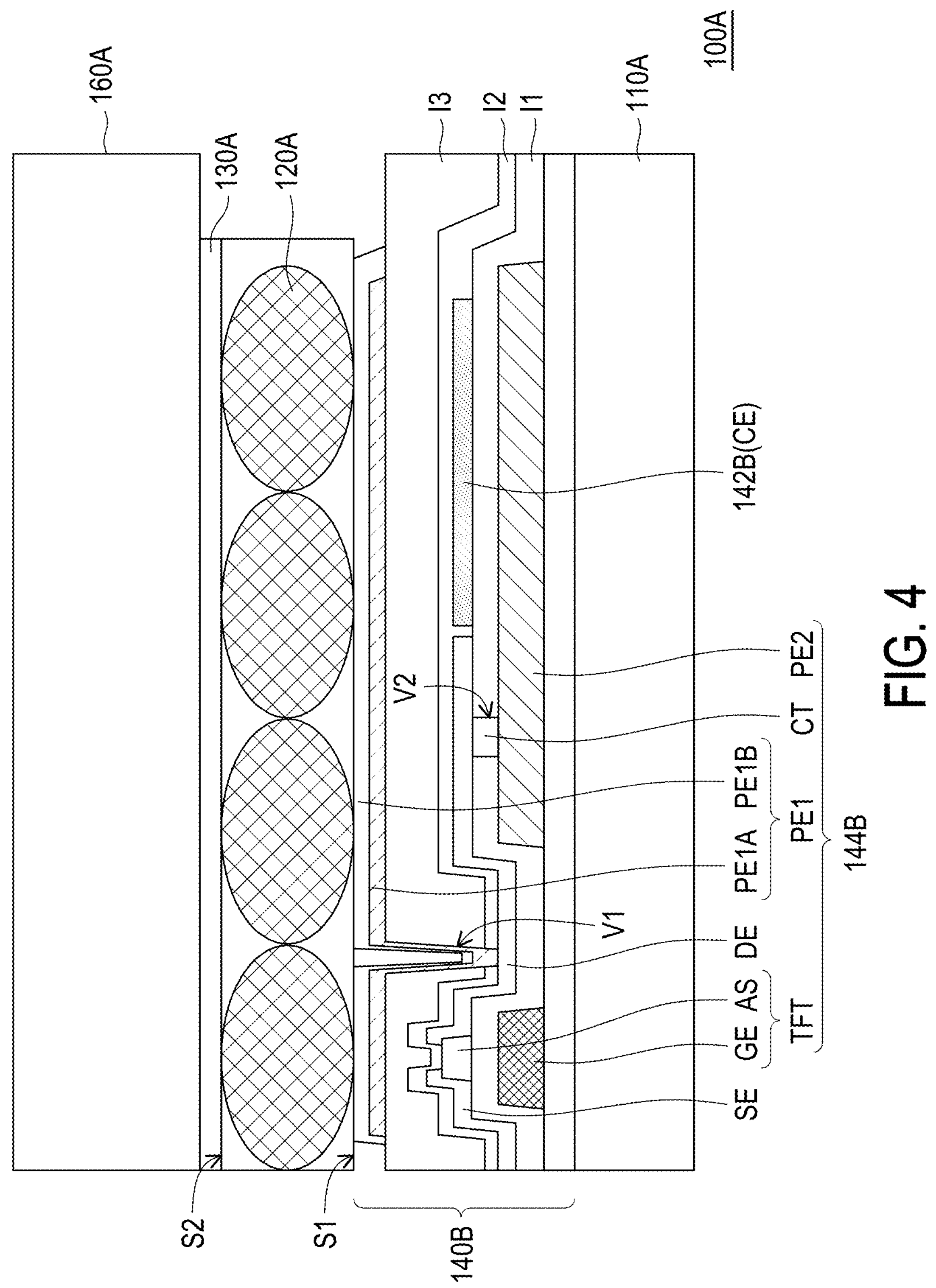
FIG. 4 is a schematic partial cross-sectional view of an E-paper display panel of an embodiment of the invention.

FIG. 4 is a schematic partial cross-sectional view of an E-paper display panel of an embodiment of the invention. The reference numerals employed in FIG. 1 are substantially the same as the reference numerals of FIG. 1 and are used to refer to the same elements. FIG. 4 is used to represent a possible stacking sequence of individual elements in the E-paper display panel in a cross-sectional view, but is not limited thereto. An E-paper display panel 100A of FIG. 4 includes a first substrate 110A, a second substrate 160A, an E-paper display layer 120A, a common electrode layer 130A, and a pixel array layer 140B. Specifically, the E-paper display panel 100A may further include the driving circuit 150 shown in FIG. 1, but the driving circuit 150 is omitted in FIG. 4 for convenience of illustration. The connection relationship and signal transmission relationship of the E-paper display layer 120A, the common electrode layer 130A, and the pixel array layer 140B are as provided in the description of the E-paper display layer 120, the common electrode layer 130, and the pixel array layer 140 in FIG. 1. Therefore, FIG. 4 is mainly used to illustrate a possible implementation of the stack configuration of the E-paper display layer 120A, the common electrode layer 130A, and the pixel array layer 140B.

As shown in FIG. 4, the E-paper display layer 120A is disposed between the first substrate 110A and the second substrate 160A, and the first substrate 110A and the second substrate 160A are respectively located at a first side S1 and a second side S2 of the E-paper display layer 120A, wherein the first side S1 is opposite to the second side S2. The common electrode layer 130A is disposed between the second substrate 160A and the E-paper display layer 120A, and is specifically located at the second side S2 of the E-paper display layer 120A. The pixel array layer 140B is disposed between the first substrate 110A and the E-paper display layer 120A, and is specifically located at the first side S1 of the E-paper display layer 120A.

The pixel array layer 140B includes touch electrodes 142B and driving pixels 144B. There are a plurality of touch electrodes 142B and driving pixels 144B, but FIG. 4 only shows a single driving pixel 144B and a corresponding touch electrode 142B for the convenience of illustration. Each of the driving pixels 144A includes the active element TFT, the first pixel electrode PE1, and the second pixel electrode PE2. The active element TFT includes a semiconductor layer AS, the gate GE, the source SE, and the drain DE. The semiconductor layer AS is located between the source SE and the drain DE and in contact with the source SE and the drain DE. The gate GE is connected to the corresponding scan line (such as the scan lines 146 shown in FIG. 1), the source SE is connected to the corresponding data line (such as the data lines 148 shown in FIG. 1), and the drain DE is connected to the corresponding first pixel electrode PE1 and second pixel electrode PE2. Here, the first pixel electrode PE1 may include two pixel electrode sublayers PE1A and PE1B of different materials, but not limited thereto.

As shown in FIG. 4, the touch electrodes 142B are located between the first pixel electrode PE1 and the second pixel electrode PE2 to serve as capacitive electrodes of the driving pixels 144B (such as the capacitive electrodes CE marked in FIG. 1). Therefore, in addition to the function of touch sensing, the touch electrodes 142B may also serve as storage capacitors to stabilize the display quality of the E-paper display panel 100A during the display of images.

In FIG. 4, the pixel array layer 140B may be composed of a plurality of patterned conductive layers, a plurality of insulating layers, and one or a plurality of semiconductor layers. For example, the gate GE and the second pixel electrode PE2 may be composed of a first conductive layer; the source SE, the drain DE, and the touch electrodes 142B may be composed of a second conductive layer; the pixel electrode sub-layer PE1A of the first pixel electrode PE1 may be composed of a third conductive layer; and the pixel electrode sub-layer PE1B of the first pixel electrode PE1 may be composed of a fourth conductive layer. At least one insulating layer may be separately disposed between the first conductive layer, the second conductive layer, and the third conductive layer. For example, a first insulating layer I1 is disposed between the first conductive layer and the second conductive layer, and a second insulating layer I2 and a third insulating layer I3 are disposed between the second conductive layer and the third conductive layer, but not limited thereto. Moreover, the first pixel electrode PE1 may be extended into a through hole V1 penetrating through the second insulating layer I2 and the third insulating layer I3 to be connected to the drain DE, the second pixel electrode PE2 may be connected to the drain DE via a connecting electrode CT, and the connecting electrode CT penetrates through the first insulating layer I1. In this way, both the first pixel electrode PE1 and the second pixel electrode PE2 are connected to the drain DE, so that the first pixel electrode PE1 and the second pixel electrode PE2 are electrically connected to each other. In the present embodiment, the third insulating layer I3 may have a relatively large thickness to serve as a planar layer.

The material of the first insulating layer I1, the second insulating layer I2, and the third insulating layer I3 may be selected from an inorganic insulating material such as silicon oxide, silicon nitride, and silicon oxynitride, and may also be selected from polyimide or other available organic insulating materials. In addition, the first conductive layer, the second conductive layer, and the third conductive layer may be made of a metal conductive material, and the fourth conductive layer may be made of a transparent conductive material, but not limited thereto. The conductive metal material may include copper, aluminum, molybdenum, silver, or an alloy of the above metals, and the layer of the conductive metal material may be formed by stacking a plurality of sub-metal layers (the materials of the sub-metal layers may be the same or different). The transparent conductive material may include indium tin oxide, indium zinc oxide, and the like.

FIG. 5 is a schematic top view of the touch electrodes in the E-paper display panel of an embodiment of the invention. Touch electrodes 142C of FIG. 5 may be used as an alternative implementation of the touch electrodes 142 of FIG. 1. The touch electrode 142C includes N capacitive electrodes CE. Each of the capacitive electrodes CE may be disposed in one corresponding driving pixel (refer to the driving pixels 144A of FIG. 2 or the driving pixels 144B of FIG. 4). In the present embodiment, the entire row of the capacitive electrodes CE arranged along the first direction D1 may be connected into a single touch electrode 142C via a plurality of capacitive connecting segments CC3. Therefore, each of the plurality of touch electrodes 142C is extended along the first direction D1 and the plurality of touch electrodes 142C may be arranged in parallel along the second direction D2. The plurality of touch electrodes 142C may be individually in signal communication with the driving circuit (such as the driving circuit 150 shown in FIG. 1 so that the touch electrodes 142 may be operated independently). In other embodiments, the touch electrodes 142C may be formed by connecting a plurality of rows of the capacitive electrodes CE, not limited to a single row of the capacitive electrodes CE. For example, the designer may determine the size of the touch electrodes 142 according to the resolution desired by the touch function.

Figure 6:
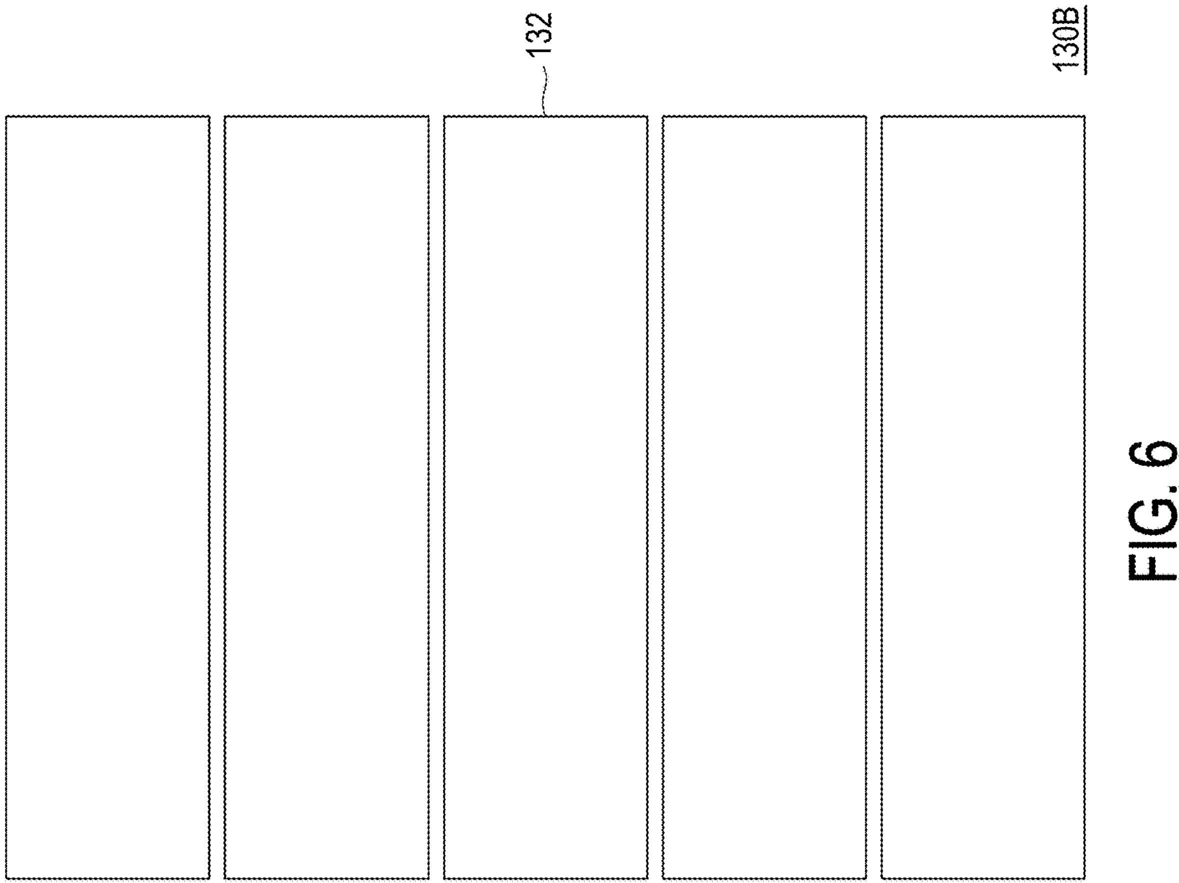
FIG. 6 is a schematic top view of a common electrode layer in an E-paper display panel of an embodiment of the invention.

FIG. 6 is a schematic top view of a common electrode layer in an E-paper display panel of an embodiment of the invention. A common electrode layer 130B may include a plurality of common electrodes 132. Each of the common electrodes 132 is extended along the second direction D2, and the common electrodes 132 are arranged in parallel in the first direction D1. The common electrodes 132 may be independently connected to the driving circuit without being directly electrically connected to each other. In other embodiments, the common electrodes 132 may be patterned and arranged in an array, wherein each of the common electrodes 132 may define an independent touch sensing area to allow the user to perform a single-point pressing operation, but not limited thereto.

The elongated common electrode layer 130B of FIG. 6 may be applied in the same E-paper display panel together with the touch electrodes 142C of FIG. 5. The common electrodes 132 of FIG. 6 and the touch electrodes 142C of FIG. 5 are strip electrodes extended in different directions. The capacitive coupling between the common electrodes 132 of FIG. 6 and the touch electrodes 142C of FIG. 5 may provide a mutual capacitive touch sensing function. For example, one of the common electrodes 132 of FIG. 6 and the touch electrodes 142C of FIG. 5 may be used as driving electrodes, and the other may be used as reading electrodes, allowing the user to perform a single-point or multi-point touch operation.

Figure 7:
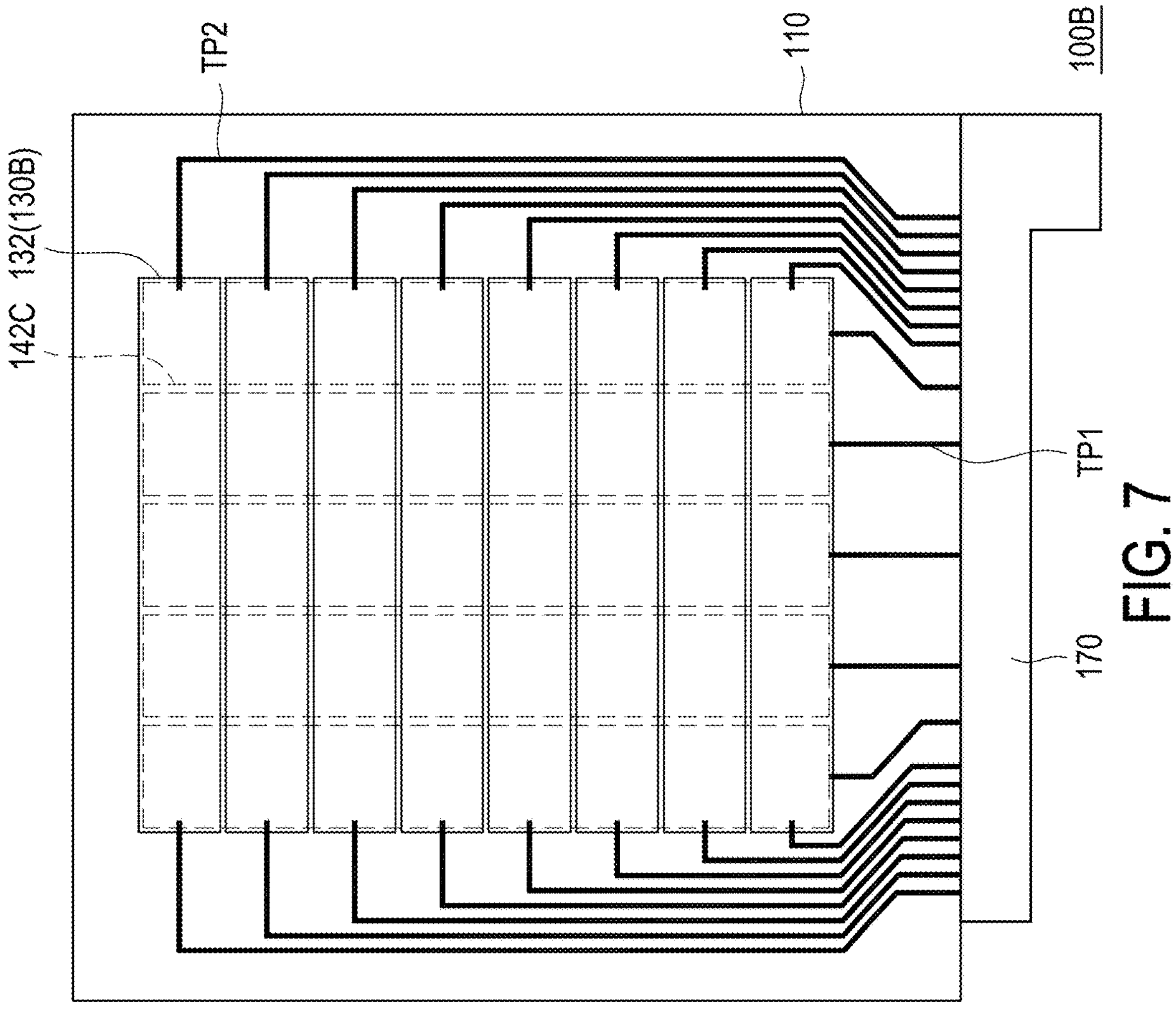
FIG. 7 is a schematic diagram of an E-paper display panel of an embodiment of the invention.

FIG. 7 is a schematic diagram of an E-paper display panel of an embodiment of the invention. For convenience of description, FIG. 7 mainly presents a first substrate, a common electrode layer, a touch electrode, and a driving circuit. In FIG. 7, an E-paper display panel 100B may include the first substrate 110, the common electrode layer 130B, the plurality of touch electrodes 142C, and a circuit board 170. Specifically, the E-paper display panel 100B may further include the E-paper display layers 120/120A, the pixel array layers 140/140A/140B, and the second substrates 160 and 160A not shown in FIG. 7 but described in the foregoing embodiments. In the present embodiment, the circuit board 170 may be bonded on the first substrate 110 and includes the driving circuit 150 as shown in FIG. 1. The E-paper display panel 100B includes a plurality of first transmission lines TP1 and a plurality of second transmission lines TP2. The common electrode layer 130B includes the plurality of common electrodes 132, which may be described with reference to FIG. 6. For the touch electrodes 142C, reference may be made to the description of FIG. 5. In addition, the first transmission lines TP1 are respectively extended between one of the touch electrodes 142C and the circuit board 170, and the second transmission lines TP2 are respectively extended between one of the common electrodes 132 and the circuit board 170. In this way, each of the touch electrodes 142C and each of the common electrodes 132 may be independently connected to the driving circuit 150 disposed on the circuit board 170 (please refer to FIG. 1). Therefore, the signals of the plurality of touch electrodes 142C are independent from each other, and the signals of the plurality of common electrodes 132 are independent from each other. For the plurality of common electrodes 132, when the panel is touched, the signals are independent from each other, and the plurality of common electrodes 132 may be switched to the same potential state when the panel is displayed, for example: a plurality of common electrodes 132 may be switched to a short-circuit state.

One of the common electrodes 132 and the touch electrodes 142C may be used as driving electrodes and the other may be used as reading electrodes, wherein after the driving circuit 150 provides the driving signal to the driving electrodes, the driving circuit 150 may read the signal from the reading electrodes and determine whether there is a touch according to the read signal and determine the position of the touch. The first transmission lines TP1 and the second transmission lines TP2 may be disposed in the peripheral area of the E-paper display panel 100B, but not limited thereto. For example, the first transmission lines TP1 and the second transmission lines TP2 may be integrated in the pixel array layers 140/140A/140B described in the above embodiments and located in the driving pixels.

Figure 8:
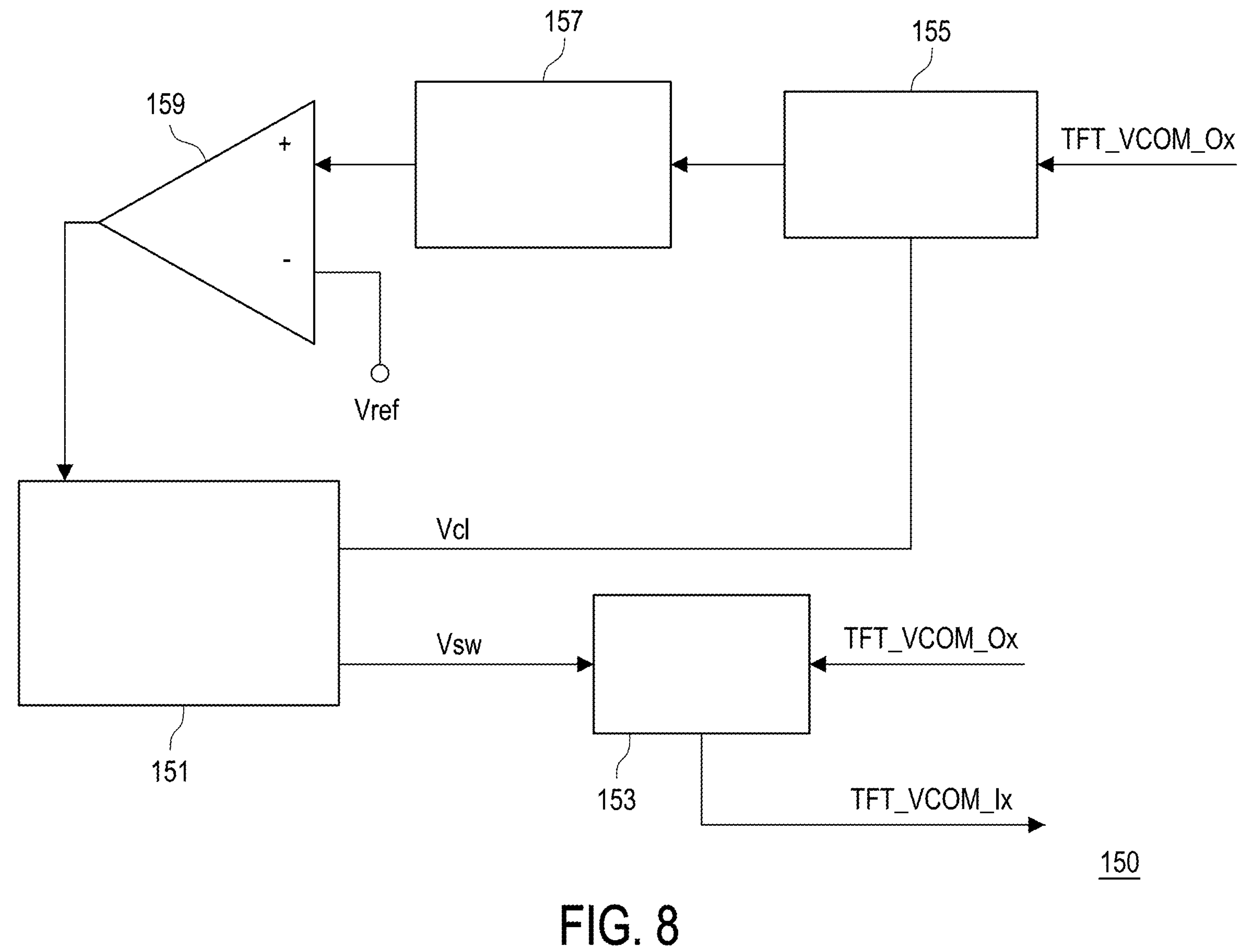
FIG. 8 is a partial schematic diagram of a driving circuit of an E-paper display panel of an embodiment of the invention.

FIG. 8 is a partial schematic diagram of a driving circuit of an E-paper display panel of an embodiment of the invention. For convenience of description, FIG. 8 provides the portion related to touch sensing in the driving circuit. In FIG. 8, the driving circuit 150 includes an FPGA 151, a switch element 153, a multiplexer 155, a rectifier 157, and a comparator 159. In some embodiments, the FPGA 151 may provide a signal Vsw to the switch element 153 to switch between the signal providing mode and the signal reading mode. The FPGA 151 provides the signal Vsw to switch the switch element 153 to the signal providing mode, and the driving circuit 150 may provide a signal TFT_V-COM_Ix to the corresponding touch electrode (such as the touch electrodes 142 of FIG. 1 or the touch electrodes 142C of FIG. 5). When the FPGA 151 provides the signal Vsw to switch the switch element 153 to the signal reading mode, the FPGA 151 also provides a control signal Vcl to the multiplexer 155, such that the multiplexer 155 reads a signal TFT_VCOM_Ox from the corresponding touch electrode (such as the touch electrodes 142 of FIG. 1 or the touch electrodes 142C of FIG. 5). The signal TFT_VCOM_Ox read by the multiplexer 155 may be processed by the rectifier 157 and the comparator 159 and then transmitted to the FPGA 151. The comparator 159 may compare the received processed signal with a reference potential Vref to determine whether there is a touch action. The FPGA 151 may determine from the result provided by the comparator 159 whether there is a touch action and/or determine the touch position.

Based on the above, the E-paper display panel of an embodiment of the invention uses one of the original capacitive electrodes and the common electrode layer as the touch electrodes, so as to implement the dual functions of touch control and display without increasing the volume of the structure.

What is claimed is:

1. An E-paper display panel, comprising:

an E-paper display layer;

a first substrate disposed at a first side of the E-paper display layer;

a pixel array layer disposed between the first substrate and the E-paper display layer, wherein the pixel array layer comprises a plurality of touch electrodes and a plurality of driving pixels arranged in an array, each of the driving pixels comprises a first pixel electrode and a second pixel electrode, and the touch electrodes, the first pixel electrode, and the second pixel electrode are overlapped with each other;

a common electrode layer disposed at a second side of the E-paper display layer, wherein the second side is opposite to the first side; and a driving circuit transmitting a signal to the individual touch electrodes.

2. The E-paper display panel of claim 1, wherein the touch electrodes comprise N capacitive electrodes, each of the N capacitive electrodes is located in one of the driving pixels and overlapped with a corresponding first pixel electrode and a corresponding second pixel electrode, and N is greater than 1 and does not exceed a number of the driving pixels.

3. The E-paper display panel of claim 1, wherein each of the touch electrodes is extended along a first direction, and the touch electrodes are arranged in parallel along a second direction, wherein the first direction is intersected with the second direction.

4. The E-paper display panel of claim 3, wherein the common electrode layer comprises a plurality of common electrodes, each of the common electrodes is extended along the second direction, and the common electrodes are arranged in parallel along the first direction.

5. The E-paper display panel of claim 1, wherein the touch electrodes are arranged in an array.

6. The E-paper display panel of claim 1, further comprising a second substrate disposed opposite to the first substrate, wherein the common electrode layer is located between the second substrate and the E-paper display layer and in direct contact with the E-paper display layer.

7. The E-paper display panel of claim 1, wherein the driving circuit is adapted to alternately execute a signal providing mode and a signal reading mode for the touch electrodes.

8. The E-paper display panel of claim 1, wherein the common electrode layer comprises a plurality of common electrodes, and the common electrodes are arranged in an array to define independent touch sensing areas.

9. The E-paper touch panel of claim 1, wherein each of the driving pixels further comprises an active element, the active element comprises a gate, a source, and a drain, and both the first pixel electrode and the second pixel electrode are connected to the drain.

10. The E-paper display panel of claim 1, wherein the first pixel electrode comprises two pixel electrode sublayers made of different materials.

11. The E-paper display panel of claim 1, wherein each of the touch electrodes comprises a plurality of capacitive electrodes and a plurality of connecting segments, the connecting segments connect the capacitive electrodes together, and each of the capacitive electrodes is located in one of the driving pixels.

* * * * *